(12) United States Patent
Guo et al.

(10) Patent No.: US 11,294,210 B2
(45) Date of Patent: Apr. 5, 2022

(54) NARROW-BEZEL DISPLAY PANEL AND DISPLAY DEVICE

(71) Applicant: WUHAN CHINA STAR OPTOELECTRONICS TECHNOLOGY CO., LTD., Wuhan (CN)

(72) Inventors: Chunpeng Guo, Hubei (CN); Gonghua Zou, Hubei (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 237 days.

(21) Appl. No.: 16/615,354

(22) PCT Filed: Nov. 6, 2019

(86) PCT No.: PCT/CN2019/116051
§ 371 (c)(1),
(2) Date: Nov. 20, 2019

(87) PCT Pub. No.: WO2020/238027
PCT Pub. Date: Dec. 3, 2020

(65) Prior Publication Data
US 2021/0325709 A1 Oct. 21, 2021

(30) Foreign Application Priority Data
May 28, 2019 (CN) .......................... 201910448573.3

(51) Int. Cl.
G02F 1/133 (2006.01)
G02F 1/1333 (2006.01)
G02F 1/1345 (2006.01)

(52) U.S. Cl.
CPC ...... *G02F 1/13306* (2013.01); *G02F 1/13452* (2013.01); *G02F 1/133308* (2013.01)

(58) Field of Classification Search
CPC ......... G02F 1/132–133; G02F 1/13306; G02F 1/133308; G02F 1/13452; G02F 1/13362;
(Continued)

(56) References Cited

U.S. PATENT DOCUMENTS 7,965,366 B2 * 6/2011 Shie ...................... H05K 3/361
349/149
8,897,035 B2 * 11/2014 Lee ................... G02F 1/133308
345/905
(Continued)

FOREIGN PATENT DOCUMENTS

CN 104504998 A 4/2015
CN 107180594 A 9/2017
(Continued)

*Primary Examiner* — Tuan T Dinh
(74) *Attorney, Agent, or Firm* — Benesh, Friedlander, Coplan & Aronoff LLP

(57) ABSTRACT

A narrow-bezel display panel includes a display region, a lower border, a driving chip, and a flexible circuit board. The lower border is connected to the display region. The driving chip is placed in the lower border. The flexible circuit board is arranged in the lower border and electrically connected to the driving chip. The driving chip is provided with an accommodating region toward the flexible circuit board, and the accommodating region receives one end of the flexible circuit board. Accordingly, a size of the lower border of the display panel is reduced.

16 Claims, 3 Drawing Sheets

(58) Field of Classification Search
CPC .... H05K 1/18; H05K 1/181–188; H05K 3/00; H05K 3/02; G06F 3/03; G06F 3/036
USPC ........ 361/749–750, 780–784, 792–795, 803; 174/254–262; 349/149–152
See application file for complete search history.

(56) References Cited

U.S. PATENT DOCUMENTS

| | | | |
|---|---|---|---|
| 2008/0166889 A1* | 7/2008 | Rathsack | G03F 1/70 |
| | | | 438/795 |
| 2011/0169792 A1* | 7/2011 | Shimizu | G02F 1/1309 |
| | | | 345/204 |
| 2011/0267320 A1* | 11/2011 | Hu | G02F 1/13452 |
| | | | 345/204 |
| 2015/0279263 A1* | 10/2015 | Lim | G09G 3/2092 |
| | | | 345/214 |
| 2017/0238446 A1 | 8/2017 | Wu | |
| 2017/0352834 A1* | 12/2017 | Kim | G02F 1/133305 |
| 2018/0092214 A1* | 3/2018 | Kashiwada | H01L 23/5385 |
| 2018/0143483 A1* | 5/2018 | Jang | G02F 1/133509 |
| 2018/0366066 A1* | 12/2018 | Kim | G09G 3/3677 |
| 2019/0094641 A1* | 3/2019 | Choi | H01L 27/1218 |
| 2020/0204756 A1 | 6/2020 | Lu | |

FOREIGN PATENT DOCUMENTS

| | | |
|---|---|---|
| CN | 108388054 A | 8/2018 |
| CN | 109459896 A | 3/2019 |
| CN | 109493745 A | 3/2019 |
| CN | 208689312 U | 4/2019 |
| JP | 2010212338 A | 9/2010 |

\* cited by examiner

NARROW-BEZEL DISPLAY PANEL AND DISPLAY DEVICE

FIELD OF DISCLOSURE

The present invention relates to a field of display panel technology and in particular, to a narrow-bezel display panel and a display device.

DESCRIPTION OF RELATED ART

With development of technology, popularity of mobile phones, and increasing aesthetic values, there is a growing interest in screen ratios of mobile phones. At present, the mainstream flagship mobile phones on the market have a screen ratio of substantially 90% or more, leading to an increasingly larger display area, which not only provides users better visual experiences, but also makes the mobile phones look simple and beautiful.

At present, increasing a screen ratio of a mobile phone panel using a chip-on-glass (COG) process is difficult in reducing a lower border of the panel. A driving chip of the panel needs to be bonded to a glass through a bonding process, and the driving chip for driving a gate electrode and a source/drain electrode and processing images must take up a certain area of the lower border. The lower border not only has the driving chip bonded thereto, but also has a flexible circuit board (FPC) bonded to itself. The flexible circuit board is configured to provide power and signals to the driving chip. Therefore, the combination of both the driving chip and the flexible circuit board hinders further narrowing of the lower border of the panel.

SUMMARY

At present, increasing a screen ratio of a mobile phone panel using a chip-on-glass (COG) process is difficult in reducing a lower border of the panel. A driving chip of the panel needs to be bonded to the glass through a bonding process, and the driving chip for driving a gate electrode and a source/drain electrode and processing images must take up a certain area of the lower border. The lower border not only has the driving chip bonded thereto, but also has a flexible circuit board (FPC) bonded to itself. The flexible circuit board is configured to provide power and signals to the driving chip. Therefore, the combination of both the driving chip and the flexible circuit board hinders further narrowing of the lower border of the panel.

It is an objective of the present invention to provide a narrow-bezel display panel and a display device, so that a size of a lower border of the display panel is further reduced.

Accordingly, the present invention provides a narrow-bezel display panel, comprising a display region, a lower border, a driving chip, and a flexible circuit board. The lower border is connected to the display region. The driving chip is disposed in the lower border. The flexible circuit board is disposed in the lower border and electrically connected to the driving chip. The driving chip is provided with an accommodating region toward the flexible circuit board, and the accommodating region receives one end of the flexible circuit board.

According to one embodiment of the present invention, a width of the accommodating region is greater than or equal to a width of the flexible circuit board.

According to one embodiment of the present invention, the driving chip comprises a bottom edge and at least one side edge connected to the bottom edge, and the accommodating region is defined between the bottom edge and the at least one side edge.

According to one embodiment of the present invention, the at least one side edge comprises a first lateral portion and a second lateral portion disposed corresponding to the first lateral portion, and the accommodating region is defined between the first lateral portion, the bottom edge, and the second lateral portion.

According to one embodiment of the present invention, the driving chip has an L shape.

According to one embodiment of the present invention, a length of the first lateral portion is equal to a length of the second lateral portion, and the driving chip has a U shape.

According to one embodiment of the present invention, the lower border comprises a fan-out region, a connection region, the driving chip, and a lower border edge, and the flexible circuit board comprises a flexible-circuit-board fan-out area and a flexible-circuit board pad area, and the fan-out region is tapered to connect the connection region.

According to one embodiment of the present invention, the fan-out region comprises a virtual pixel region, a pixel separation region, and a chip test region.

According to one embodiment of the present invention, the flexible-circuit-board fan-out area and the flexible-circuit-board pad area have a same width, and the width of the flexible-circuit-board fan-out area and the flexible-circuit-board pad area is less than a width of the driving chip.

The present invention further provides a display device which comprises the narrow-bezel display panel of the above embodiments.

According to one embodiment of the present invention, a width of the accommodating region is greater than or equal to a width of the flexible circuit board.

According to one embodiment of the present invention, the driving chip comprises a bottom edge and at least one side edge connected to the bottom edge, and the accommodating region is defined between the bottom edge and the at least one side edge.

According to one embodiment of the present invention, the at least one side edge comprises a first lateral portion and a second lateral portion disposed corresponding to the first lateral portion, and the accommodating region is defined between the first lateral portion, the bottom edge, and the second lateral portion.

According to one embodiment of the present invention, the driving chip has an L shape.

According to one embodiment of the present invention, a length of the first lateral portion is equal to a length of the second lateral portion, and the driving chip has a U shape.

According to one embodiment of the present invention, the lower border comprises a fan-out region, a connection region, the driving chip, and a lower border edge, and the flexible circuit board comprises a flexible-circuit-board fan-out area and a flexible-circuit board pad area, and the fan-out region is tapered to connect the connection region.

According to one embodiment of the present invention, the fan-out region comprises a virtual pixel region, a pixel separation region, and a chip test region.

According to one embodiment of the present invention, the flexible-circuit-board fan-out area and the flexible-circuit-board pad area have a same width, and the width of the flexible-circuit-board fan-out area and the flexible-circuit-board pad area is less than a width of the driving chip.

Advantages of the Present Invention

The present invention also has the following advantages. The driving chip is designed into a U shape or an L shape.

The driving chip has the same functions as common driving chips. By having the accommodating space in the driving chip, a middle portion in the driving chip is reduced, so that the flexible-circuit-board fan-out area of the flexible circuit board can be disposed therein, a size of the lower border of the display panel can be further reduced, and thereby a screen ratio is increased to 93.3% or more.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DETAILED DESCRIPTION OF EMBODIMENTS

In the following description, it should be noted that, specific features, structures or characteristics described in connection with an embodiment may be included in at least one embodiment of the invention. The same terms appearing in different places in the specification are not necessarily limited to the same embodiment, but should be understood as independent or alternative embodiments to other embodiments. In view of technical solutions disclosed in the embodiments of the present invention, those skilled in the art should understand that the embodiments described herein may have other combinations or modifications based on the embodiments of the present invention.

Figure 1:
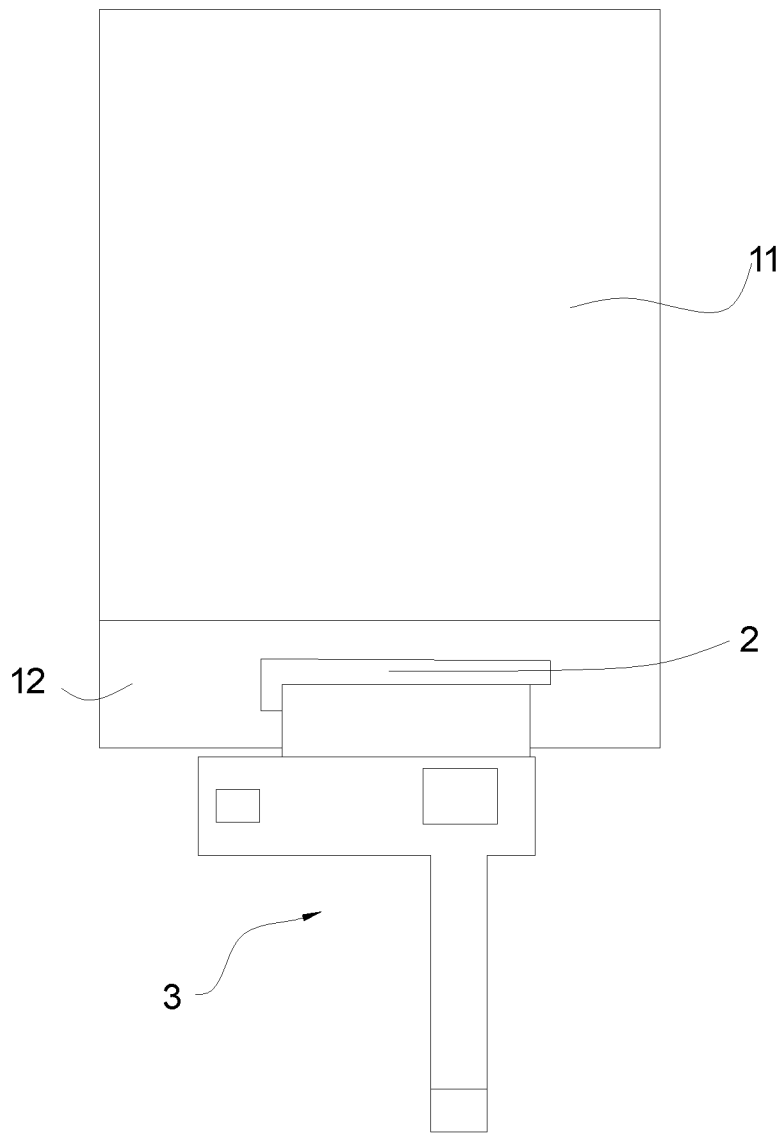
FIG. 1 is a schematic planar view illustrating a narrow-bezel display panel of the present invention.

Referring to FIG. 1, FIG. 1 is a schematic planar view illustrating a narrow-bezel display panel and a display device. As shown in FIG. 1, the present invention provides a narrow-bezel display panel 1. The narrow-bezel display panel 1 comprises a display region 11, a lower border 12, a driving chip 2, and a flexible circuit board 3. The display panel 1 of the present embodiment is, but is not limited to, a thin-film-transistor liquid crystal display (TFT-LCD) panel.

Figure 2:
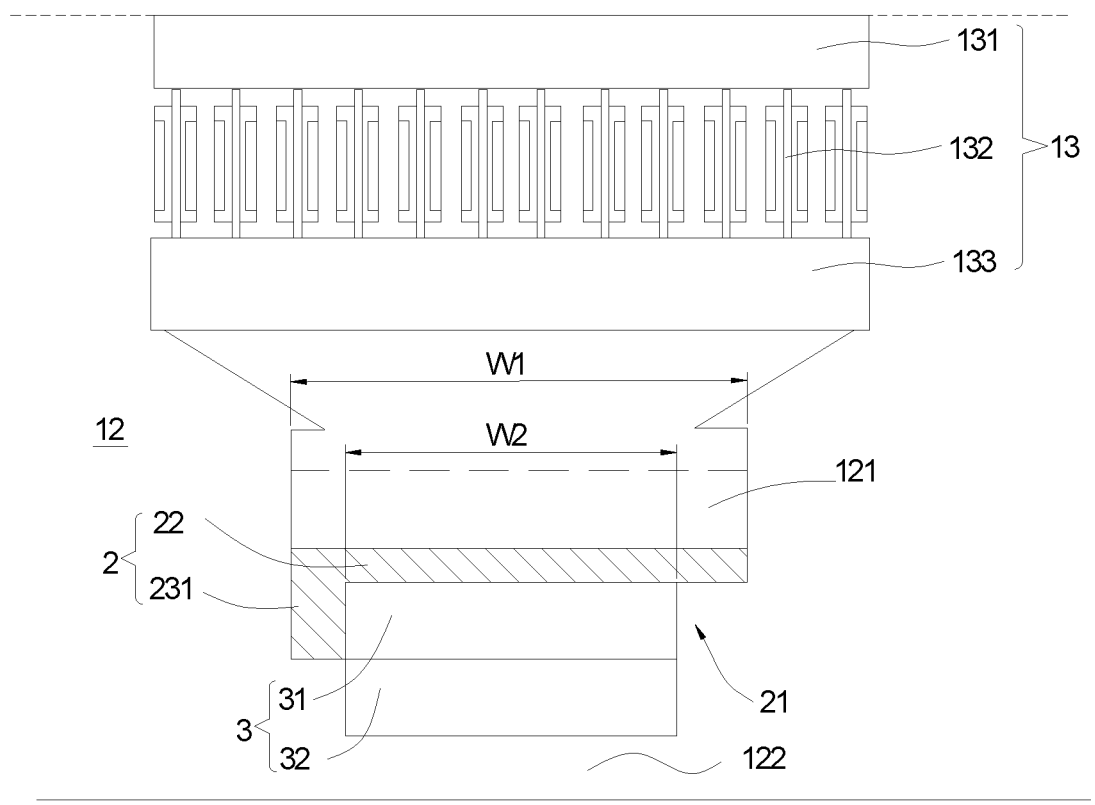
FIG. 2 is a schematic enlarged view of FIG. 1, illustrating a lower border of the narrow-bezel display panel.

Referring to FIG. 2, the lower border 12 is connected to the display region 11. The driving chip 2 is disposed in the lower border 12. The flexible circuit board 3 is disposed in the lower border 12 and electrically connected to the driving chip 2. The driving chip 2 is provided with an accommodating region 21 toward the flexible circuit board 3, and the accommodating region 21 receives one end of the flexible circuit board 3.

A width of the accommodating region 21 is greater than a width of the flexible circuit board 3. In the embodiment shown in FIG. 3, the width of the accommodating region 21 is equal to the width of the flexible circuit board 3. In the embodiment shown in FIG. 2, the driving chip 2 comprises a bottom edge 22 and at least one side edge 23 connected to the bottom edge 22, and the accommodating region 21 is defined between the bottom edge 22 and the at least one side edge 23. The driving chip 2 has an L shape.

Figure 3:
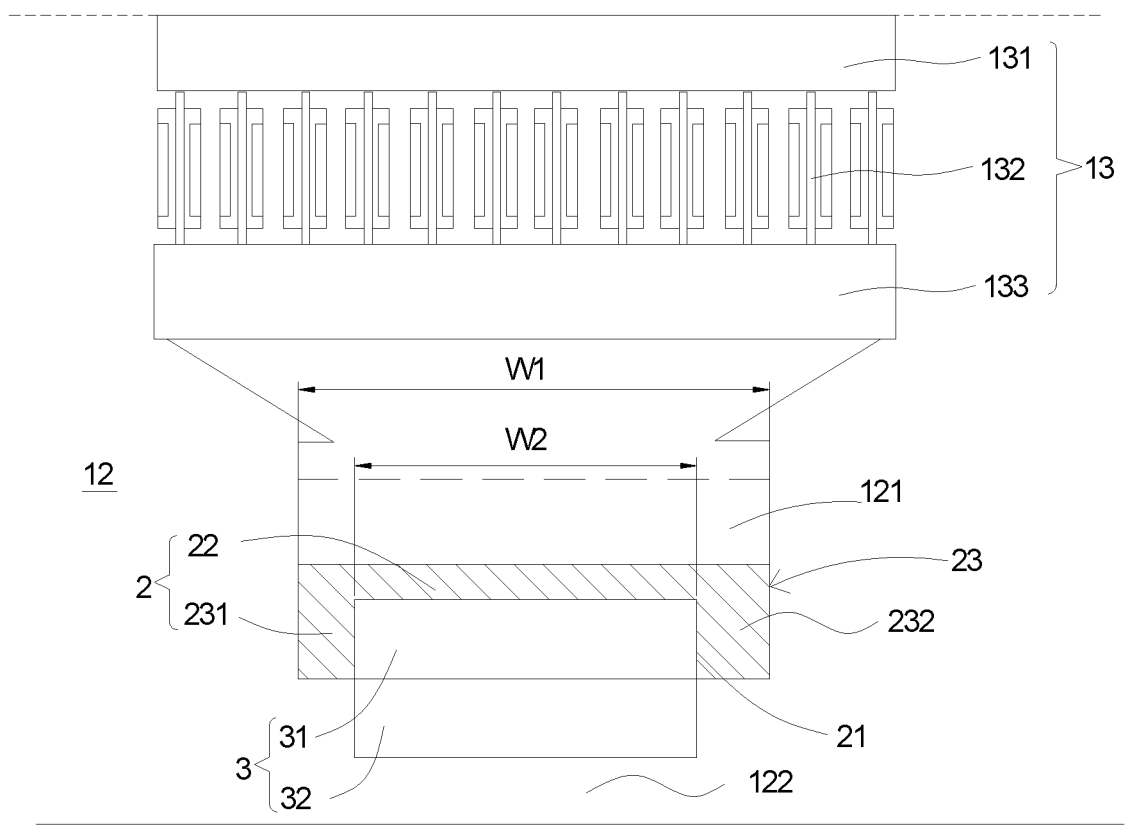
FIG. 3 is a schematic enlarged view, illustrating the lower border of the narrow-bezel display panel according to another embodiment.

As shown in FIG. 3, the at least one side edge 23 comprises a first lateral portion 231 and a second lateral portion 232 disposed corresponding to the first lateral portion 231, and the accommodating region 21 is defined between the first lateral portion 231, the bottom edge 22, and the second lateral portion 232. A length of the first lateral portion 231 is equal to a length of the second lateral portion 232, and the driving chip 2 has a U shape.

In the embodiments shown in FIGS. 2 and 3, the lower border 12 comprises a fan-out region 13, a connection region 121, the driving chip 2, and a lower border edge 122. The flexible circuit board 3 comprises a flexible-circuit-board fan-out area 31 and a flexible-circuit-board pad area 32, and the fan-out region 13 is tapered to connect the connection region 121. The fan-out region 13 comprises a virtual pixel region 131, a pixel separation region 132, and a chip test region 133. The flexible-circuit-board fan-out area 31 and the flexible-circuit-board pad area 32 have a same width W2, and the width W2 of the flexible-circuit-board fan-out area 31 and the flexible-circuit-board pad area 32 is less than a width W1 of the driving chip 2.

After a design of the display panel 1 is decided, a layout of the fan-out region 13 cannot be changed, and layouts of the connection region 121 and the flexible-circuit-board fan-out area 31 are limited by a bonding-process machine table and also cannot be modified. A layout of the flexible-circuit-board pad area 32 is limited by a design of the flexible circuit board 3 and the bonding process machine table and cannot be modified. Therefore, only a size or the width of the driving chip 2 can be changed. In the present embodiment, the driving chip 2 is designed to be U-shaped, L-shaped, or of other suitable shape. The driving chip 2 provides the same functions as common driving chips. By having the accommodating region 21, the driving chip 2 is reduced in its middle portion, so that the flexible-circuit-board fan-out area 31 of the flexible circuit board 3 can be disposed in the accommodating region 21, a size of the lower border 12 of the display panel 1 can be further reduced, and a screen ratio is increased to 93.3% or more.

Furthermore, the present invention provides a display device which comprises the narrow-bezel display panel 1 in the above embodiments. Other structures and functions of the display device are known in the prior art and will not be described herein.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A narrow-bezel display panel, comprising:
   a display region;
   a lower border connected to the display region;
   a driving chip disposed in the lower border; and
   a flexible circuit board disposed in the lower border and electrically connected to the driving chip, wherein the driving chip is provided with an accommodating region toward the flexible circuit board, the accommodating region receives one end of the flexible circuit board, the end of the flexible circuit board contacts the driving chip, the driving chip comprises a bottom edge and at least one side edge connected to the bottom edge, and the accommodating region is defined between the bottom edge and the at least one side edge.

2. The narrow-bezel display panel according to claim 1, wherein a width of the accommodating region is greater than or equal to a width of the flexible circuit board.

3. The narrow-bezel display panel according to claim 1, wherein the at least one side edge comprises a first lateral portion and a second lateral portion disposed corresponding to the first lateral portion, and the accommodating region is defined between the first lateral portion, the bottom edge, and the second lateral portion.

4. The narrow-bezel display panel according to claim 1, wherein the driving chip has an L shape.

5. The narrow-bezel display panel according to claim 1, wherein the lower border comprises a fan-out region, a connection region, the driving chip, and a lower border edge, and the flexible circuit board comprises a flexible-circuit-board fan-out area and a flexible-circuit-board pad area, and the fan-out region is tapered to connect the connection region.

6. The narrow-bezel display panel according to claim 3, wherein a length of the first lateral portion is equal to a length of the second lateral portion, and the driving chip has a U shape.

7. The narrow-bezel display panel according to claim 5, wherein the fan-out region comprises a virtual pixel region, a pixel separation region, and a chip test region.

8. The narrow-bezel display panel according to claim 5, wherein the flexible-circuit-board fan-out area and the flexible-circuit-board pad area have a same width, and the width of the flexible-circuit-board fan-out area and the flexible-circuit-board pad area is less than a width of the driving chip.

9. A display device, comprising:
a narrow-bezel display panel, comprising:
a display region;
a lower border connected to the display region;
a driving chip disposed in the lower border; and
a flexible circuit board disposed in the lower border and electrically connected to the driving chip, wherein the driving chip is provided with an accommodating region toward the flexible circuit board, and the accommodating region receives one end of the flexible circuit board, the end of the flexible circuit board contacts with the driving chip, the driving chip comprises a bottom edge and at least one side edge connected to the bottom edge, and the accommodating region is defined between the bottom edge and the at least one side edge.

10. The display device according to claim 9, wherein a width of the accommodating region is greater than or equal to a width of the flexible circuit board.

11. The display device according to claim 9, wherein the at least one side edge comprises a first lateral portion and a second lateral portion disposed corresponding to the first lateral portion, and the accommodating region is defined between the first lateral portion, the bottom edge, and the second lateral portion.

12. The display device according to claim 9, wherein the driving chip has an L shape.

13. The display device according to claim 9, wherein the lower border comprises a fan-out region, a connection region, the driving chip, and a lower border edge, and the flexible circuit board comprises a flexible-circuit-board fan-out area and a flexible-circuit board pad area, and the fan-out region is tapered to connect the connection region.

14. The display device according to claim 11, wherein a length of the first lateral portion is equal to a length of the second lateral portion, and the driving chip has a U shape.

15. The display device according to claim 13, wherein the fan-out region comprises a virtual pixel region, a pixel separation region, and a chip test region.

16. The display device according to claim 13, wherein the flexible-circuit-board fan-out area and the flexible-circuit-board pad area have a same width, and the width of the flexible-circuit-board fan-out area and the flexible-circuit-board pad area is less than a width of the driving chip.

* * * * *